United States Patent [19]
Serizawa et al.

[11] Patent Number: 5,884,961
[45] Date of Patent: Mar. 23, 1999

[54] DOOR WIRE HARNESS ARRANGEMENT STRUCTURE FOR VEHICLES

[75] Inventors: Yasuyoshi Serizawa; Mitsunobu Kato; Keizo Nishitani; Mitsuru Karasawa, all of Shizuoka, Japan

[73] Assignee: Yazaki Corporation, Tokyo, Japan

[21] Appl. No.: 5,004

[22] Filed: Jan. 9, 1998

[30] Foreign Application Priority Data

Feb. 6, 1997 [JP] Japan ................................. 9-023761

[51] Int. Cl.⁶ ........................................................ B60J 5/04
[52] U.S. Cl. ................................................... 296/146.7
[58] Field of Search ............................ 296/152, 146.7, 296/146.12

[56] References Cited

U.S. PATENT DOCUMENTS 4,653,799  3/1987  Arai et al. ........................ 296/146.12
4,862,011  8/1989  Wright ................................ 296/152
5,716,044  2/1998  Peterson et al. ..................... 296/152

Primary Examiner—Gary C. Hoge
Attorney, Agent, or Firm—Armstrong, Westerman, Hattori, McLeland & Naughton

[57] ABSTRACT

A door wire harness arrangement structure is provided. In this structure, a wire harness is taken into a wire harness protector case, with a part of it being folded like a ring. The ring-like portion of the wire harness can freely expand and contract inside the wire harness protector case. A wire harness support pin stands inside the wire harness protector case, which is provided with a circular or semicircular wire harness receiving portion. The wire harness protector case is made up of a case main body and a cover. The case main body has a trough-like slide guide portion to accommodate a wire harness protector. The case main body and a door trim panel may be integrally formed.

8 Claims, 4 Drawing Sheets

DOOR WIRE HARNESS ARRANGEMENT STRUCTURE FOR VEHICLES

BACKGROUND OF THE INVENTION

1. Field of the Invention

The present invention relates to a door wire harness arrangement structure for vehicles in which a door wire harness for connecting a door of a vehicle to its main body can contract inside the door in synchronization with opening and closing of the door.

2. Related Art

FIG. 6 illustrate the door wire harness arrangement structure disclosed in Japanese Patent Application No. 8-176687 filed by the present applicant.

In this structure, a wire harness 60 is arranged from a vehicle main body 70 to a door inner panel 71 via a wire harness protector 72 made of a synthetic resin. The wire harness protector 72 is made slidable along the door inner panel 71 in synchronization with opening and closing of a door 73. The wire harness 60 exiting from the wire harness protector 72 is secured to the door inner panel 71 with a clip 61 so as to swing freely.

A connector 75 of a wire harness extending from the vehicle is rotatably attached to a bracket 76 of the vehicle main body 70. The wire harness extending from the door penetrates through the stiff wire harness protector 72 and is connected to a connector (not shown) at the front end of the protector 72. This connector is connected to the connector 75 of the wire harness extending from the vehicle. The door inner panel 71 is horizontally provided with a slide guide 77. A protrusion (not shown) at the rear end of the wire harness protector 72 is slidably engaged with the slide guide 77.

The wire harness 60 of the door exits from a rear opening of the wire harness protector 72 and extends diagonally upward. It then passes through the clip 61 and further extends rearward. As the wire harness protector 72 moves from the front end to the rear end of the slide guide, the wire harness 60 swings at an angle of θ like a pendulum, with the clip 61 being the supporting point.

A door trim panel 78 is attached to the door inner panel 71, and the wire harness protector 72 is disposed between the door inner panel 71 and the door trim panel 78.

With the above configuration of the prior art, however, there has been a problem that since the wire harness 60 swings along the door inner panel 71 with the clip 61 being the supporting point, the surface of the door inner panel and the inner surface of the door trim panel are easily worn out. Another problem is that due to the pendulum-like swinging of the wire harness 60, the area occupied by the wire harness moving portion 79 inside the door becomes large, leading to interference with an air duct inside the door. To avoid such interference, the arrangement of components inside the door has been strictly limited. It is also troublesome to secure the wire harness 60 with the clip 61.

SUMMARY OF THE INVENTION

The principal object of the present invention is to provide a door wire harness arrangement structure for vehicles which can prevent the wear of the surface of a door inner panel and the inner surface of a door trim panel, and eliminate the limitation to the arrangement of the components inside a door. With such structure, wire harness arrangement can be simplified.

To achieve the above object, the present invention provides a door wire harness arrangement structure in which s wire harness protector case is provided inside a vehicle door, a wire harness protector is slidably engaged with the wire harness protector case, one end of the wire harness protector is connected to the vehicle main body, and a wire harness is introduced into the wire harness protector case through another end of the wire harness protector. One aspect of the feature of this structure is that the wire harness is folded like a ring and taken into the wire harness protector case, and the ring-like portion of the wire harness can freely expand and contract inside the wire harness protector case.

A wire harness support pin stands in the wire harness protector case, and the ring-like portion of the wire harness is positioned around the wire harness support pin. The wire harness protector case is provided with a circular or semi-circular wire harness receiving portion. The wire harness protector case also includes a case main body and a cover, and this case main body has a trough-like slide guide portion. The case main body and the door trim panel may be integrally formed.

The above and other objects and features of the present invention will be more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
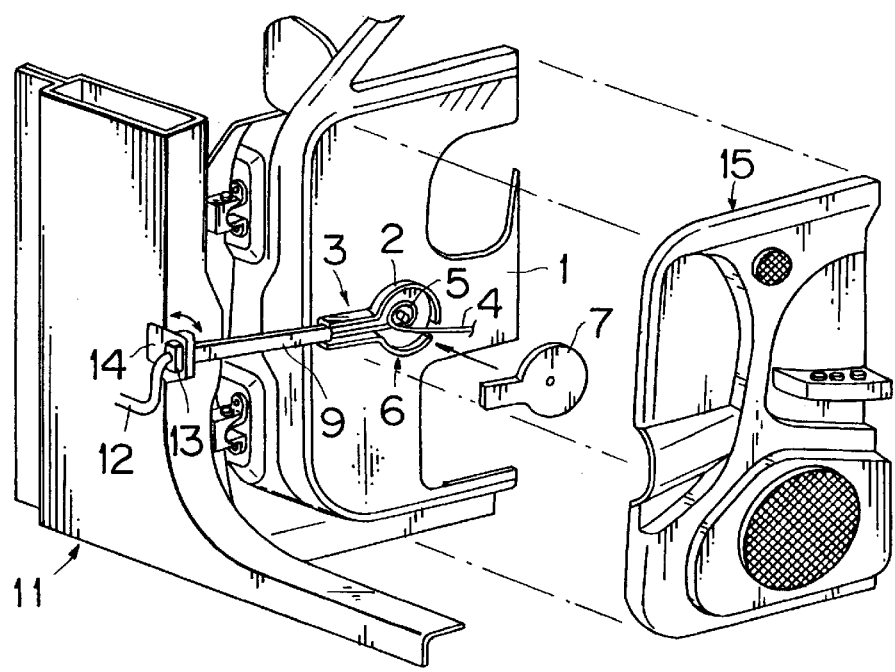
FIG. 1 is an exploded perspective view of a first embodiment of the door wire harness arrangement structure for vehicles of the present invention.
Figure 2:
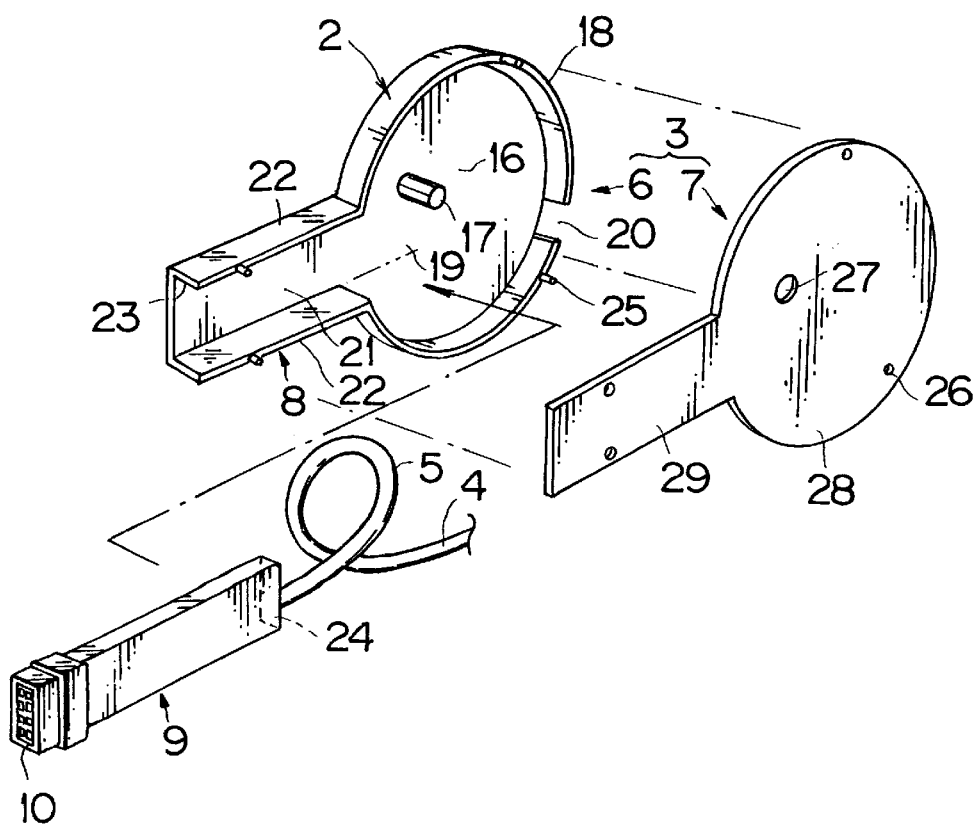
FIG. 2 is an exploded perspective view of part of the doorwire harness arrangement structure of FIG. 1.

FIGS. 1 and 2 show an embodiment of the door wire harness arrangement structure of the present invention.

As shown in FIG. 1, in this structure, a door inner panel 1 is provided with a synthetic resin protector case 3 having a circular wire harness receiving portion 2, a door wire harness 4 is folded in the form of a ring and taken into the wire harness receiving portion 2, and the harness ring portion 5 expands and contracts to absorb the expansion and contraction of the wire harness 4.

The wire harness protector case 3 is made up of a case main body 6 (shown in FIG. 2) secured to the surface of the door inner panel 1, and a cover 7 for covering the case main body 6.

A wire harness protector 9 slides along a trough-like slide guide portion 8 of the wire harness protector case 3. As in the prior art, the wire harness protector 9 is made of a synthetic resin and formed into a rectangular shape. The rear end of the wire harness protector 9 is slidably engaged with the slide guide portion 8 of the wire harness protector case 3, while a connector 10 at the front end of the wire harness protector 9 is connected to a connector 13 of a wire harness 12 extending from the main body 11 of the vehicle. The connector 13 is rotatably supported by a bracket 14. A door trim panel 15 is attached to the door inner panel 1, and the wire harness protector case 3 is disposed between the door inner panel 1 and the door trim panel 15.

As shown in FIG. 2, the case main body 6 of the wire harness protector case 3 consists of the circular wire harness receiving portion 2 and the trough-like slide guide portion 8 provided on the front side of the wire harness receiving portion 2.

The wire harness receiving portion 2 is provided with a circular bottom plate 16, a cylindrical wire harness support pin 17, and a circuit wall 18 provided on the outer periphery of the bottom plate 16. The wire harness support pin 17 is situated at a position slightly above the center point of the bottom plate 16, so as to maintain a protector inserting path 19 inside the wire harness receiving portion 2 on the extension line of the slide guide portion 8. An opening 20 from which the wire harness extends is formed at the rear end of the circular wall 18.

The circular bottom plate 16 communicates with a rectangular bottom plate 21 of the slide guide portion 8, while the circular wall 18 communicates with both side walls 22 of the slide guide portion 8. Thus, the slide guide portion 8 leads to the wire harness receiving portion 2. An opening 23 for receiving the wire harness protector is formed at the front end of the slide guide portion 8.

The wire harness protector 9 is slidably engaged with the slide guide portion 8. An engaging pin (not shown) can be provided on the rear end of the wire harness protector 9, and a guide groove (not shown) corresponding to the engaging pin can be provided on the slide guide portion 8.

The wire harness 4 extending from the rear opening 24 of the wire harness protector 9 is upwardly formed into the ring potion 5. The diameter of the ring portion 5 can be elongated and shortened by hooking the wire harness support pin 17 or keeping the wire harness support pin 17 inside the ring portion 5. Thus, the wire harness 4 can freely expand and contract in synchronization with the sliding movements of the wire harness protector 9.

When the door is opened, the diameter of the ring portion 5 of the wire harness 4 is shortened, with the wire harness support pin 17 being the center point. By doing so, the shape of the ring portion 5 can be maintained by virtue of the wire harness support pin 17, and the diameter of the ring portion 5 can be smoothly elongated when the door is closed.

A plurality of securing pins 25 for securing the cover 7 are provided on the circular wall 18 and the side wall 22 of the wire harness protector case 3. Engaging holes 26 for receiving the securing pins 25 and an engaging hole 27 for receiving the wire harness support pin 17 are formed on the surface of the cover 7. The cover 7 is made of a synthetic resin and formed into a flat plate, consisting of a circular plate 28 corresponding to the wire harness receiving portion 2 and a rectangular plate 29 corresponding to the slide guide portion 8. The cover 7 is positioned and secured to the case main body 6 with the securing pins 25 and the wire harness support pin 17. The securing pins 25, secure the cover 7 by pressurizing or welding.

Figure 3:
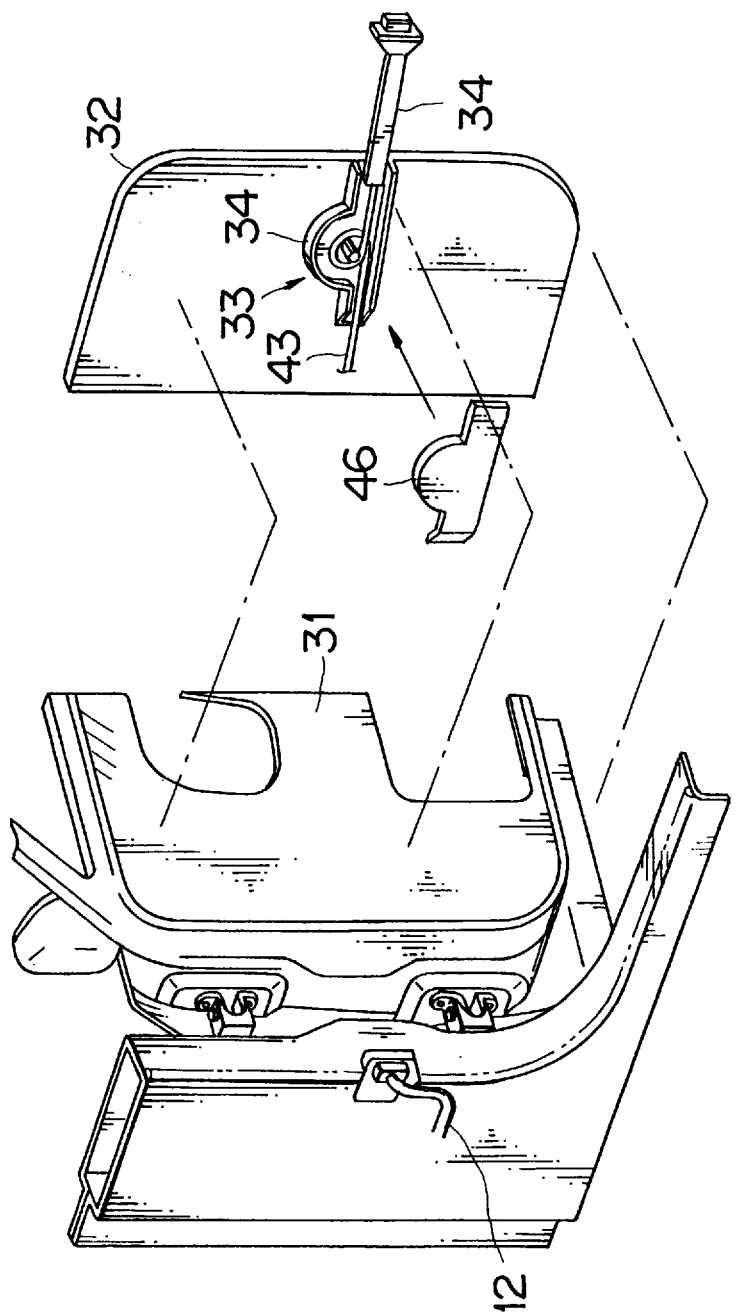
FIG. 3 is an exploded perspective view of another embodiment of the door wire harness arrangement structure vehicles of the present invention.
Figure 4:
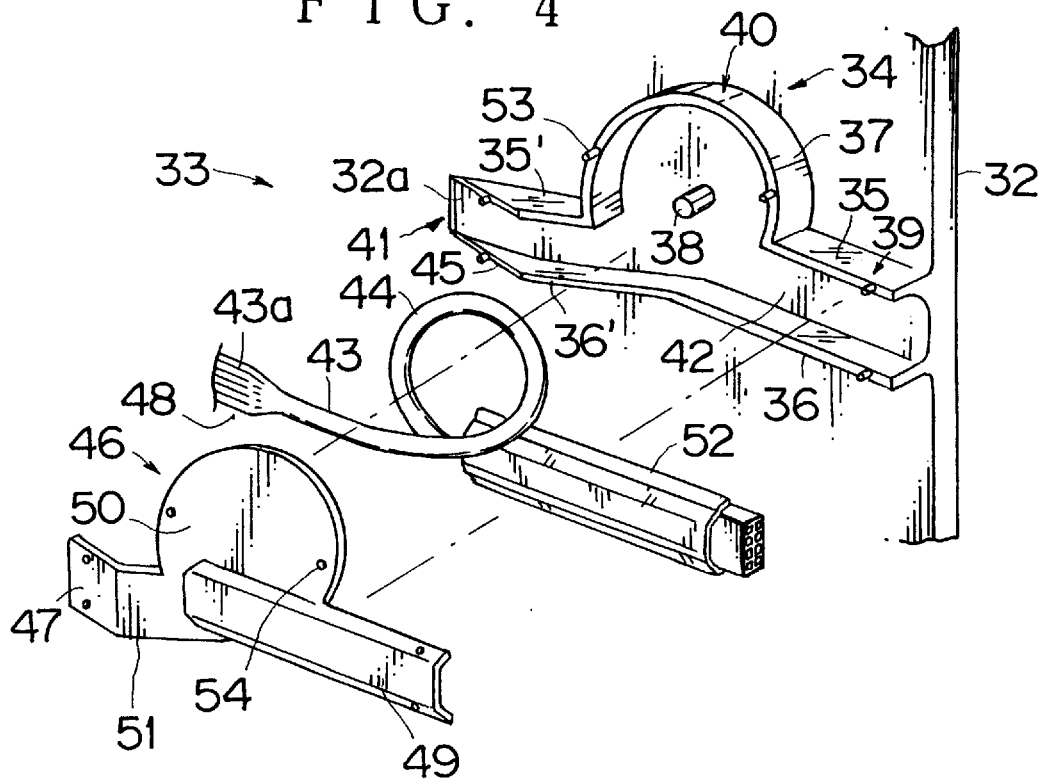
FIG. 4 is an exploded perspective view of part of the door wire harness arrangement structure of FIG. 3.

FIGS. 3 and 4 illustrate another embodiment of the door wire harness arrangement structure of the present invention.

As shown in FIG. 3, in this structure, a wire harness protector case 33 is integrally formed on the inner surface of a door trim panel 32 made of a synthetic resin. The door trim panel is attached to a door panel 31. The door panel 31 and the wire harness of the main body of the vehicle are the same as in the previous embodiment. The structure, in which the door trim panel 32 is provided with a wire harness protector 52, has been already suggested by the present applicant.

As shown in FIG. 4, the case main body 34 of the wire harness protector case 33 consists of upper and lower side walls 35 and 36 standing from the surface of the door trim panel 32, a semicircular wall 37 continuously formed halfway of the upper side wall 35, and a wire harness support pin 38 which stands from the surface of the door trim panel 32 roughly in the middle of the semicircular wall 37.

A slide guide portion 39 for guiding the wire harness protector 52 is formed by the front half of the upper and lower side walls 35 and 36 with the wire harness support pin 38 in the middle. A wire harness receiving portion 40 is formed by the semicircular wall 37. A wire harness exit portion 41 is formed by the rear half of upper and lower side walls 35' and 36' with the wire harness support pin 38 in the middle.

The wire harness support pin 37 is in a position slightly higher than the slide guide portion 30 so as to ensure a protector inserting path 42. A wire harness 43 extending from the wire harness protector 34 has a ring portion 44 formed by a part of the wire harness 43. The ring portion 4 is flexibly taken into the wire harness receiving portion 40, with the wire harness support pin 38 being the center point.

The rear end of the wire harness exit portion 41 is tapered, and a cover 46 is provided with a tapered wall (a wire harness pressing unit) 47 so as to meet with the tapered portion 45. Between the tapered wall 47 and the rear surface of the door trim panel 32a (the bottom surface of the protector case), a flat portion in which wires 43a are arranged in parallel is interposed and secured.

The cover 46 for the case main body 34 is made up of a slide guide portion 49 for guiding the wire harness protector 52, a circular plate 50 corresponding to the ring portion 44 of the wire harness 43, and a wire harness exit portion 51 which includes the tapered wall 47. The slide guide portion 49 is formed by outwardly bulging a part of the cover 46.

The wire harness protector 52 slides forward along the slide guide portions 39 and 49 in synchronization with opening and closing of the door. The wire harness protector 52 is provided with slide protrusions (not shown). The slide guide portion 39 can be provided with a guide groove or a guide hole. Securing pins 53 are provided on the circular wall 37 and the side walls 35, 35', 36, and 36' of the case main body 34. The cover 46 is secured to an engaging hole 54 with the securing pins 53.

As in this embodiment, the number of components employed can be reduced by integrally forming the case main body 34, which includes a part of the door trim panel 32.

Figure 5A:
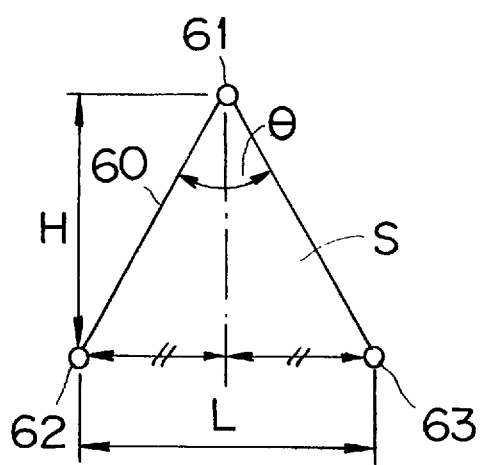
FIGS. 5A and 5B show the comparison between the prior art and the present invention with respect to the areas occupied by wire harness moving portions.
Figure 5B:
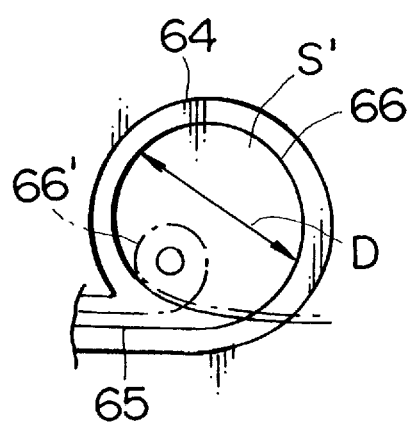
Figure 6:
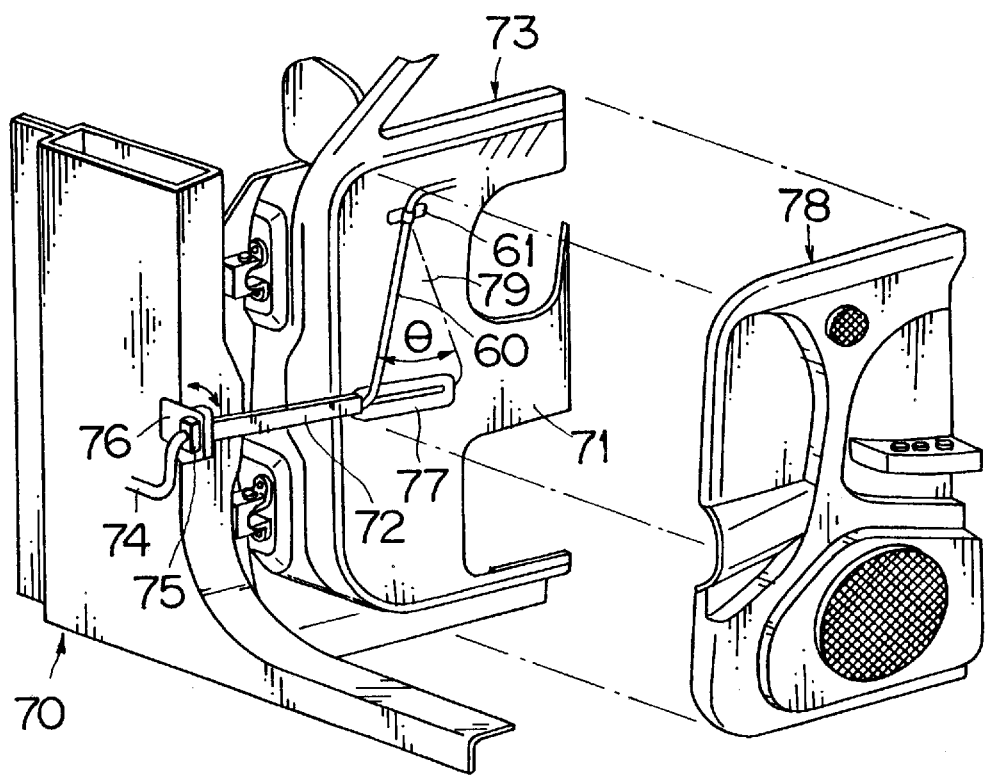
FIG. 6 is an exploded perspective view of the prior art.

FIGS. 5A and 5B show the comparison between the prior art and the present invention with respect to the areas occupied by the wire harness moving portions.

If the length of a wire harness taken into a wire harness protector is made 150 mm in the prior art, the area S occupied by the harness moving portion is approximately 9700 mm$^2$, because the wire harness 60 extending from the wire harness protector swings at an angle of 60° in an interval L of 200 mm between a starting point 62 at the time of opening the door and a finishing point 63 at the time of closing the door, with a supporting point (a clip) 61 disposed in a position where the height H is approximately 170 mm, as shown in FIG. 5A.

Meanwhile, according to the present invention, a ring portion 66 of a wire harness 65 inside a wire harness receiving portion 64 is approximately 65 mm in diameter, and the area S' occupied by the ring portion of the wire harness 65 is approximately 3300 mm², which is roughly a third of the area S in the prior art, as shown in FIG. 5B. Broken line 66' in FIG. 5B illustrates how the ring portion of the wire harness 65 shrinks when the door is closed.

The door wire harness arrangement structure of the present invention described so far can be applied to other types of door, such as back doors of vehicles.

As described above, according to the present invention, the ring portion of the wire harness can expand and contract in the circular wire harness receiving portion of the wire harness protector case, so that the wire harness will not swing with long strokes. Also, since the wire harness is hold inside the wire harness protector case, the door inner panel and the door trim panel does not interfere with each other. As the area occupied by the wire harness moving portion (the flexible portion) is smaller than in the prior art, the positioning of the door inner components is not limited. For instance, even if one of the components interferes with the expanded ring portion of the wire harness (i.e., the wire harness is bulging out of the wire harness protector case), the ring portion will be bent inward, thereby giving no damage to the wire harness. Furthermore, the wire harness can be arranged inside the wire harness protector case by a simple process of folding the wire harness around the wire harness support pin. Thus, the workability in wire harness arrangement can be improved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A door wire harness arrangement structure for vehicles, comprising:
    a wire harness protector case provided inside a door of a vehicle;
    a wire harness protector slidably engaged with said wire harness protector case, one end of said wire harness protector being connected to a vehicle main body; and
    a wire harness extending from another end of said wire harness protector to the inside of said wire harness protector case, said wire harness being folded like a ring and taken into said wire harness protector case, the ring-like portion being capable of expanding and contracting freely inside said wire harness protector case.

2. The door wire harness arrangement structure for vehicles according to claim 1, wherein
    said wire harness protector case is provided with a wire harness support pin standing therein, and
    said ring-like portion is positioned around said wire harness support pin.

3. The door wire harness arrangement structure for vehicles according to claim 1 or 2, wherein
    said wire harness protector case is provided with a circular or semicircular wire harness receiving portion.

4. The door wire harness arrangement structure for vehicles according to claim 3, wherein
    said wire harness receiving portion comprises a circular bottom plate, said wire harness support pin standing on the surface of said bottom plate, and a circular wall standing around said bottom plate.

5. The door wire harness arrangement structure for vehicles according to claim 4, wherein
    said wire harness support pin is disposed in a position slightly higher than the center point of said bottom plate.

6. The door wire harness arrangement structure for vehicles according to any of claim 1 or 2, wherein
    said wire harness protector case is made up of a case main body and a cover, and
    said case main body has a trough-like slide guide portion to accommodate the wire harness protector.

7. The door wire harness arrangement structure for vehicles according to claim 6, wherein
    said case main body and a door trim panel are integrally formed.

8. The door wire harness arrangement structure for vehicles according to claim 6, wherein
    said slide guide portion communicates with said wire harness receiving portion.

* * * * *